R. E. HELLMUND.
REGENERATIVE CONTROL SYSTEM.
APPLICATION FILED SEPT. 28, 1917.

1,385,996.

Patented Aug. 2, 1921.
3 SHEETS—SHEET 1.

WITNESSES:
T. R. Krear
F. A. Lind

INVENTOR
Rudolf E. Hellmund
BY
Wesley G. Carr
ATTORNEY

R. E. HELLMUND.
REGENERATIVE CONTROL SYSTEM.
APPLICATION FILED SEPT. 28, 1917.

1,385,996.

Patented Aug. 2, 1921.
3 SHEETS—SHEET 3.

WITNESSES:
T. R. Krear
F. A. Lind

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

REGENERATIVE CONTROL SYSTEM.

1,385,996.     Specification of Letters Patent.     Patented Aug. 2, 1921.

Continuation of application No. 75,958, filed February 3, 1916. This application filed September 28, 1917. Serial No. 193,696.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Regenerative Control Systems, of which the following is a specification, this application being a continuation of application Serial No. 75,958, filed February 3, 1916.

My invention relates to systems of control for dynamo-electric machines of the commutator type particularly adapted for operation by alternating currents, and it has for its object to provide means whereby a machine of the character designated may be operated either as a motor or as a generator, at all times deriving the major portion of its exciting current directly from the source of alternating current to which it is connected.

Figure 1:
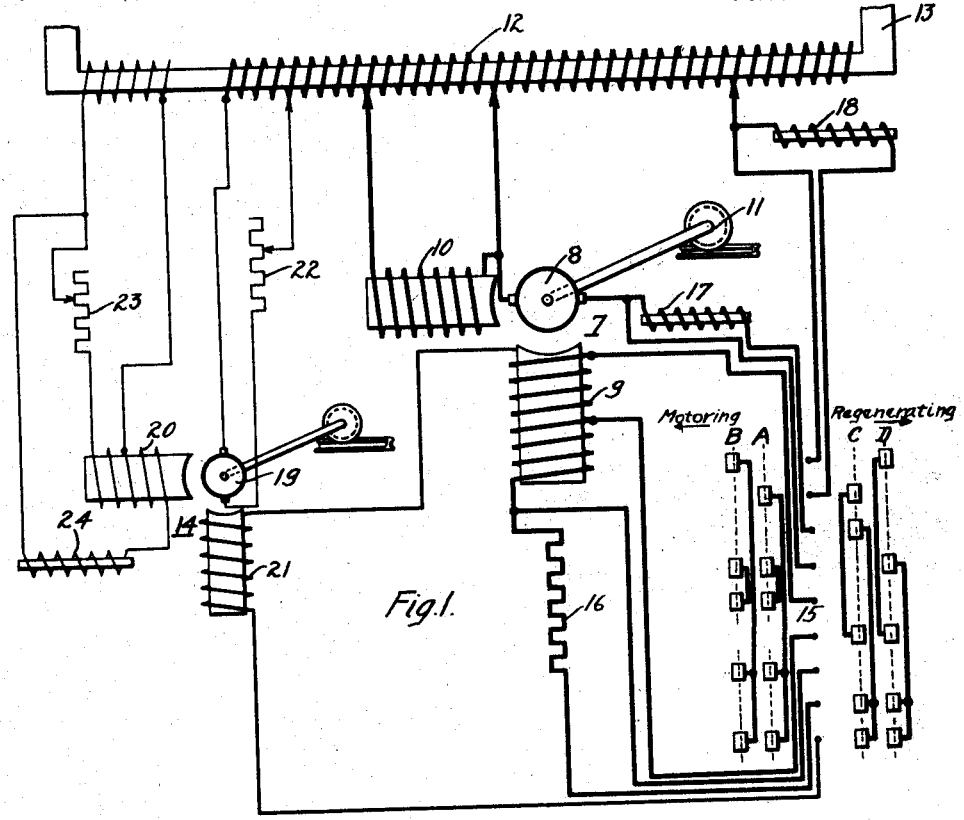
Figure 2:
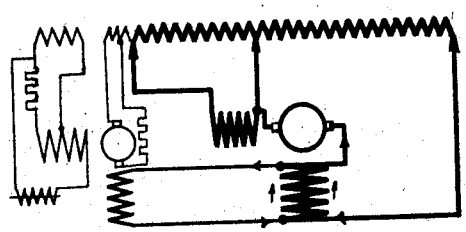
Figure 3:
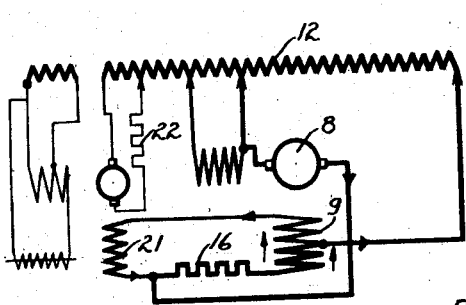

In the accompanying drawing, Figure 1 is a diagrammatic view of a dynamo-electric machine of the compensated commutator type, together with its attendant supply and control circuits and exciting apparatus, embodying a preferred form of my invention; Figs. 2, and 3 are simplified diagrammatic views illustrating different forms of the connections in the system of Fig. 1 during different phases of the operation thereof; and Figs. 4 to 9, inclusive, are views similar to Fig. 1 and illustrating different embodiments of my invention.

It is desirable to employ alternating-current for the supply of railway systems, particularly of the interurban type, because of the economy and simplicity of transmission, but, in order to obtain wide speed control with systems of the character designated, it has been necessary to employ vehicle motors of the commutator type. While operating favorably as motors, machines of this character are not inherently adapted for recuperation because of the difficulty of securing proper field excitation therein for the generation of a suitable electromotive force for superposition upon that of the line.

It has heretofore been proposed, as shown by U. S. Patent 977,641, issued to the Westinghouse Electric & Manufacturing Company upon an application filed by B. G. Lamme, to employ one of the vehicle motors or an auxiliary machine as a phase-shifter for the production of a suitable electromotive force for the excitation of the remaining motors during recuperative operation. For full effectiveness in recuperative action, it is desirable that all the main motors be operated as generators, and it is the object of the present invention to provide means whereby a portion of the excitation of the motors may be obtained from the main source during recuperative operation, thus permitting an extremely small auxiliary exciting machine to be used for phase correction.

In my copending application, Serial No. 44,443, filed Aug. 9, 1915, patented April 1, 1919, No. 1,298,706, I have shown means whereby, in the direct-current recuperative operation of a railway system, the current derived from a motor is passed through one-half of an exciting field winding, and during motor operation, is passed in the same direction through the other half of the exciting field winding, thus, at all times, assisting the excitation produced by an auxiliary source. The present invention covers the application of the same general idea to alternating-current systems, due allowance being made for the well known differences in operation between direct-current and alternating-current systems. For example, an increase in the number of turns of a winding in a direct-current system, generally speaking, increases the flux therethrough, whereas, an increase in the number of turns of a winding in an alternating-current system, generally speaking, decreases the flux therethrough.

Furthermore, my system embodies means whereby, during certain phases of motor operation, the potential difference across the points of attachment of the auxiliary source to the exciting field winding of the main machine may be adjusted by variations in the load current to a value equal and opposite to the electromotive force of the auxiliary source, whereby substantially no current is derived therefrom and more efficient operation is obtained.

Finally, my system embodies means whereby, during regeneration, the circulation of direct current or of low frequency alternating current through the different portions of the system is substantially prevented, whereby marked heating losses and other disturbances of the desired operation are prevented.

Referring to the accompanying drawing for a more detailed understanding of my invention, I show a motor of the alternating-current, commutator type at 7 in Fig. 1, said motor being provided with an armature 8, an exciting field winding 9 and a compensating field winding 10. The machine 7 is shown as applied to a railway vehicle, being mechanically connected to a car wheel 11. Energy for the machine 7 is derived from the secondary winding 12 of a transformer 13, the primary winding (not shown) of which is adapted to be energized from a trolley. An exciting electromotive force, lagging substantially 90° behind the electromotive force of the source, is applied to the winding 9 by an auxiliary machine 14, as shown and claimed in my copending application, Serial No. 23,361, filed April 23, 1915, patented Dec. 10, 1918, No. 1,287,013, although any other type of phase-converter may be employed, such as mentioned in the aforementioned patent to Lamme.

A controller 15, or equivalent means, may be employed for altering the connections in the system thus described for different phases of operation and is shown as providing two motoring positions and two recuperative positions.

A resistor 16 is employed for controlling the circulation of undesired currents and preventive devices 17 and 18 are provided for reducing the current increments.

Having thus described the arrangement of a system embodying my invention, the operation thereof is as follows. For motoring, the controller 15 is first moved to the position A, wherein the preventive device 18 is included in circuit, and is then moved to the position B, maintaining the same connections but eliminating said preventive device, the resultant connections being as shown in Fig. 2.

The right hand terminal of the transformer winding 12 is connected to the lower terminal of the field winding 9, the other connections remaining as in Fig. 2. With the connections thus established, the instantaneous values of the currents are as shown by arrows in Fig. 2. The excitation current for the winding 9 is made up of two components which are substantially in phase with each other, one of said components being supplied by the exciter machine 14. The latter may, therefore, be much smaller than would be necessary were said exciter machine to provide the entire exciting current for the main motor.

For recuperative operation, the commutator 15 is turned to the positions C and D, employing the preventive devices 17 and 18 to regulate the voltage increments and establishing the connections shown in Fig. 3. The right-hand terminal of the transformer winding 12 is connected to substantially the mid point of the exciting winding 9, but the right-hand brush of the armature 8 is connected to the lower terminal of said field winding through the intermediary of the resistor 16. The tertiary winding of the exciter machine is connected as before. With the circuits arranged as shown, the current relations are as indicated by the arrows in Fig. 3. As is well known, the phase of the load current during recuperation is substantially opposite to what it would be during motoring and thus the flow of load current through the lower half of the field winding 9 is substantially cophasial with the flow of current therethrough from the tertiary winding 21 so that the effects of these two exciting components are substantially cumulative.

It is well known that in the recuperative operation of alternating-current, series-connected, commutator-type machines, there is a tendency to self-excite and to generate a unidirectional electromotive force. The effect of this unidirectional electromotive force, in conjunction with the inductance and resistance of the system, is to produce a cyclically variable energy circulation in the system, this phenomenon mainfesting itself by low frequency circulating currents of pulsating magnitude which cause unnecessary heating and otherwise disturb the operation. The seat of the electromotive force producing these undesired currents is obviously the armature of the recuperative machine and in the system of Fig. 3, said currents tend to flow from the right-hand brush of the armature 8 to the terminal of the resistor 16 and there divide, a portion thereof traversing the resistor 16 and the lower half of the field winding 9 and the other portion thereof traversing the tertiary winding 21 and the upper half of the field winding 9. The resistance of the element 16 is adjusted to be substantially equal to that of the tertiary winding 21 so that the low frequency circulating currents are divided into substantially equal portions. The flow of these equal portions in opposite directions through the two halves of the exciting filed winding 9 establish substantially equal and opposite magnetomotive forces therein, canceling the magnetizing action of the undesired circulating currents and thus preventing them from building up to undesirable magnitudes.

As previously pointed out, the tendency of a recuperative commutator type machine is to produce cyclic transfers of energy through the system, that is to say, the armature produces an impulse of current in the associated portion of the transformer winding and the energy thereof is electromagnetically transferred to that portion of the transformer winding which energizes the exciting winding of the exciting machine. This, in turn, produces a variation in the excitation supplied by the exciter machine and causes an increment in the next succeeding undesired impulse in the recuperative machine. This harmful effect, therefore, may be damped out at the exciter machine and by placing damping means at this point in the system which are traversed only by exciting current, there is a marked saving in energy over systems wherein damping devices are placed in the load circuits of the main recuperative machine. Thus, in Fig. 1, I show a damping resistor 22 connected between the brushes of the exciter machine 14, tending to damp out the transfer of undesired low frequency impulses from the primary to the tertiary winding of said exciter machine. Obviously, the effect of such a resistor would also be to alter the phase of the tertiary voltage of said machine but this effect may be neutralized by also including a small portion of the transformer winding 12 in the armature circuit of the exciter 14.

In order to still further damp out the circulating energy of low frequency at the exciter machine, the winding 20 of the exciter 14 may be divided into two portions and the left-hand portion is connected between the terminals of a portion of the transformer winding 12 through an adjustable resistor 23, as is well-known in the art. A reactor 24 is connected across the entire field winding and the resistor 23. The inductance of the reactor 24 is so high to currents of the frequency of the source 12 that substantially all current of said frequency flows solely through the left-hand half of the field winding 20. To currents of low frequency, however, the reactor 24 opposes but little impedance and said currents, therefore, divide, the adjustment being such that substantially one-half of said undesired currents traverse the resistor 23 and the left-hand half of the field winding 20, whereas the other portion of said undesired current traverses the reactor 24 and the right-hand half of the field winding 20. The magnetizing effects of the undesired currents are thus substantially equal and opposite in the field winding 20 and the undesired energy impulses are therefore not transmitted to the main recuperative machine.

Figure 4:
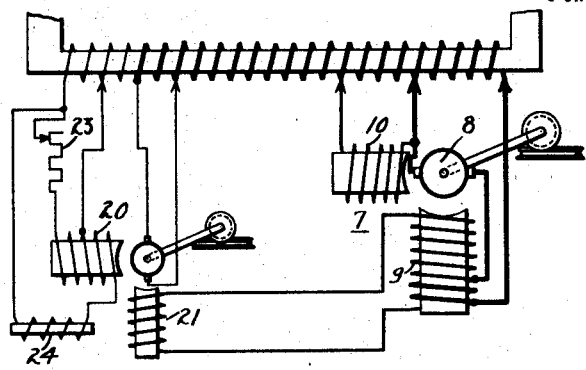
Figure 5:
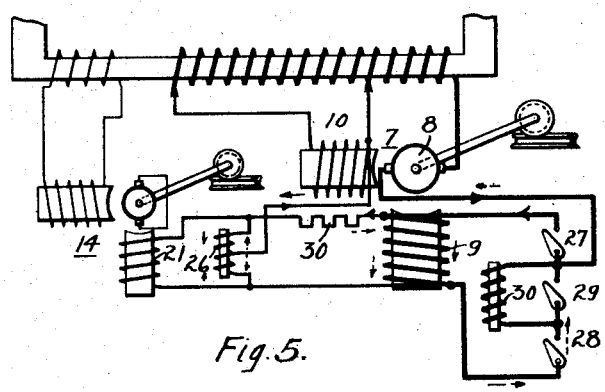

In the form of my invention shown in Fig. 4, the general arrangement of the main and exciter machines is as shown in Fig. 1 and like parts are similarly designated. When recuperating, however, the connections are different from those shown in Fig. 3 in that the right-hand brush of the armature 8 is connected to a point somewhat below the middle of the exciting winding 9. The point of attachment is so chosen that undesired circulating currents of low frequency from the armature 8 are divided into two unequal portions on reaching the winding 9, the smaller of said portions traversing the upper portion of said winding, having a relatively large number of turns, and also traversing the tertiary winding 21. The remaining or larger portion of the undesired low-frequency currents traverses the lower portion of the field winding 9, having a relatively small number of turns, and the circulating currents are then consolidated for flow to the transformer winding. The point of attachment to the field winding 9 is so chosen that the undesired ampere turns in the upper portion thereof are substantially equal and opposite to the undesired ampere turns in the lower portion thereof, thus permitting the elimination of the exciting effect of the low frequency circulating currents without necessitating the use of the resistor 16 shown in Fig. 1.

The structure shown in Fig. 1 has the disadvantage that the heating of the portion of the exciting winding which is energized by load current during motor operation greatly exceeds that of the remaining portion of the exciting winding because of the preponderance of motor operation over recuperative operation. This results in poor heat distribution within the motor and, accordingly, it is frequently found desirable to employ the structure shown in Fig. 5 wherein the inner terminal of the compensating winding 10 is connected to the midpoint of an auto-transformer 26 connected in parallel to the tertiary winding 21 of the exciter machine 14 and to the exciting field winding 9 of the main machine. The left hand brush of the machine 7 may be connected to either the upper or the lower terminals of the field winding 9 through switches 27 and 28, and the connection may be transferred by suitable manipulation of a switch 29 and of a preventive device 30.

Assume that the machine 7 is operating as a motor and that the switch 27 is closed: at a given instant, current flowing from the armature 8, as shown by the full-line arrow, passes to the upper terminal of the winding 9 and there divides, a portion flowing through the winding 9, the lower half of the auto-transformer 26 and thence to the compensating-field winding 10. The remainder flows directly to the upper terminal of the auto-transformer 26, through the upper half thereof, and thence to the compensating field winding 10. The tertiary winding 21 of the machine 14 floats across the exciting line, so to speak, and supplies the difference between the excitation supplied by the load current and that desired.

Assuming the electromotive force supplied by the machine 14 as the basis of reference, the current flow at a corresponding instant during recuperative operation may be indicated by the dotted-line arrows. The switches 28 and 29 are closed and the switch 27 opened, whereupon load current from the compensating field winding 10 passes to the middle point of the auto-transformer 26, divides and a portion flows upwardly through a resistor 30 and downwardly through the field winding 9, whereas the remainder flows directly to the armature 8 through the switches 28 and 29.

It will be observed that, during both motor and recuperative operation, the direction of flow of load current through the field winding 9 is the same, for a given direction of current flow in the exciter machine. The resistor 30 is connected between the upper terminal of the auto-transformer 26 and the upper terminal of the field winding 9, whereby the circulation and exciting effect of low-frequency currents in the exciting circuit of the machine 8 is largely retarded and damped out.

Figure 6:
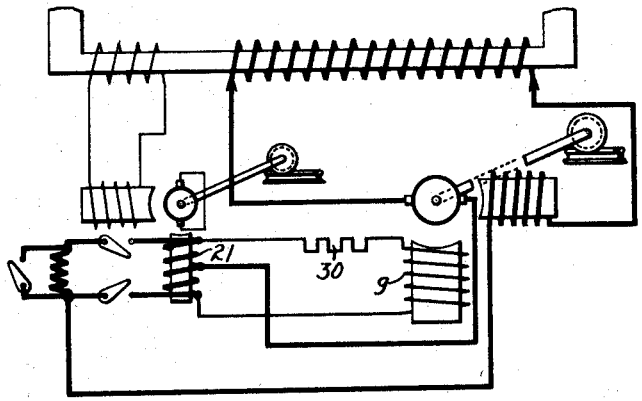

If desired, the auto-transformer 26 may be entirely dispensed with and the connection from the compensating field winding 10 made directly to the midpoint of the generating or tertiary winding 21 of the machine 14, as shown in Fig. 6, the operation being similar to that just described. A resistor 30 is connected between the upper terminal of the winding 21 and the upper terminal of the winding 9 to damp out undesired circulating currents.

Figure 7:
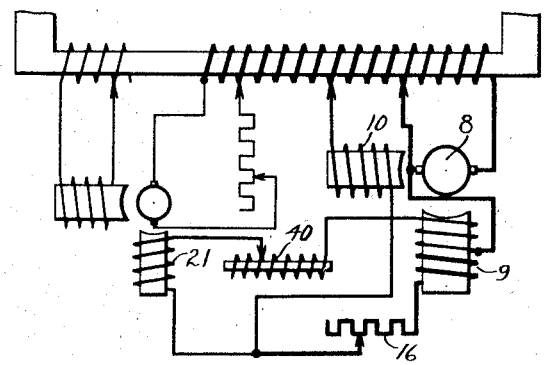

In the form of my invention shown in Fig. 7, the upper terminal of the exciting-field winding 9 is connected to the upper terminal of a tertiary winding 21 through a reactor 40, and, in like manner, the lower terminal of the exciting field winding 9 is connected to the lower terminal of the tertiary winding 21 through an adjustable resistor 16. The left-hand brush of the armature 8 is connected to substantially the mid-point of the exciting field winding 9. The right-hand terminal of the compensating field winding 10 is connected intermediate the resistor 16 and the tertiary winding 21.

The various circuit components thus described are so adjusted in their relation to each other that currents of normal frequency flowing from the compensating field winding 10 to the exciting field winding 9 are substantially precluded from traversing the tertiary winding 21 by the high reactance of the element 40. The said currents are therefore permitted to traverse only the lower half of the exciting field winding 9 and the arrangement is such that the effect of exciting currents from the exciting tertiary winding 21 is cumulative therewith, thus permitting effective recuperation.

With currents of low frequency, however, the reactance of the element 40 is low and said currents are thus permitted to divide, substantially half thereof traversing the resistor 16 and the lower half of the field winding 9, whereas the remainder traverses the tertiary winding 21, the reactor 40 and the upper half of the field winding 9. Thus the exciting effects of said low-frequency currents upon the winding 9 are substantially neutralized and the building up of low-frequency cyclic changes of energy is substantially prevented.

Figure 8:
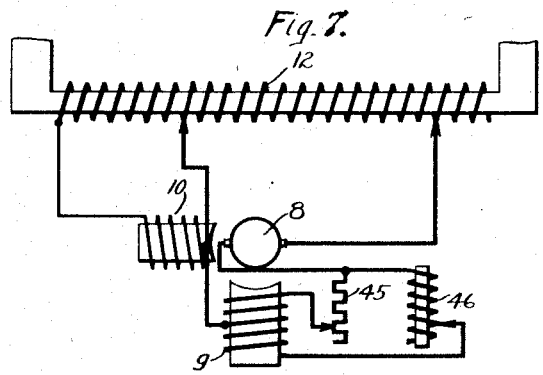
Figure 9:
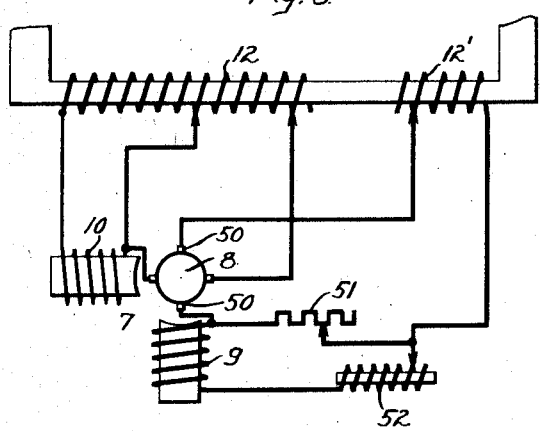

In the form of my invention shown in Fig. 8, means are shown for preventing the building up of low-frequency surges in a commutator generator, said means being susceptible of application, either with or without an auxiliary exciting machine. The left-hand brush of the armature 8 is connected to the upper terminal of the exciting field winding 9 through an adjustable resistor 45 and is further connected to the lower terminal of said field winding through an adjustable reactor 46. The right-hand terminal of the compensating field winding 10, in addition to being connected to the source 12, is connected to substantially the mid point of the exciting field winding 9.

The adjustment is such that substantially all current of line frequency traverses solely the upper half of the exciting-field winding 9, producing the desired excitation, this action being brought about by high reactance of the element 46 to currents of this character. With undesired currents of low frequency, however, the current paths through the elements 45 and 46 are of substantially equal impedance and said currents therefore divide equally between the upper and lower halves of the exciting field winding 9 and their magnetizing effects thereon are, therefore, substantially neutralized.

My invention is also susceptible of application to generators of the armature-excited type. Thus in Fig. 9, the recuperative machine 7 is provided with exciting brushes 50—50, in line with the exciting field winding 9. Said exciting field brushes are connected across a portion 12' of the source, through an adjustable resistor 51. The lower exciting brush 50 is further connected, through the exciting field winding 9 and an adjustable reactor 52, to the right-hand terminal of the resistor 51.

In operation, the exciting currents of desired high frequency flow from the winding 12' through the brushes 50—50 and the resistor 51, being substantially precluded from traversing the exciting winding 9 by reason of the high reactance of the element 52. With currents of low and undesired frequency, however, sufficient current flow is permitted through the winding 9 and the element 52 to substantially neutralize the exciting effects of said low-frequency currents in the armature winding itself. The resultant exciting effect of said low-frequency currents is therefore neutralized.

While, in many embodiments of my invention, I have shown the exciting field winding tapped at substantially its mid-point, and have shown circuits having such constants as to substantially divide currents of undesired low frequency into equal parts, in order to produce magnetizing neutralization in said exciting winding; it will be obvious that I may tap the exciting winding at any other point than the mid-point and obtain equivalent neutralization by suitable adjustment of the circuit constants, as is indicated in Fig. 4.

Throughout this application, I have pointed out the necessity of establishing connections whereby the low frequency currents set up a demagnetizing effect at least equal to the normal magnetizing effect of said low-frequency currents in the machine circuits. I find that even better results may be obtained by causing the low frequency currents to establish a demagnetizing effect which is even stronger than their normal magnetizing effect.

While I have shown my invention in its preferred forms, it will be obvious to those skilled in the art that it is susceptible of various minor changes and modifications without departing from the spirit thereof and I desire, therefore, that only such limitations shall be placed thereupon as are imposed by the prior art or are specifically set forth in the appended claims.

I claim as my invention:

1. The combination with a dynamo-electric machine having a commutated working winding and an exciting winding, of means for connecting portions of said exciting winding in series with said working winding in either directon at will, and means for supplying an auxiliary excitation comprising an auxiliary source of alternating current.

2. The combination with a source of alternating current, of a dynamo-electric machine of the commutator type provided with an exciting field winding, a device mechanically coupled thereto and adapted to either absorb mechanical energy therefrom or to supply mechanical energy thereto, an auxiliary source of alternating-current connected across the terminals of said field winding, and means for alternatively connecting said machine to said source so that the load current may pass either through substantially one-half of said exciting winding or through the remainder only of said winding.

3. The combination with a dynamo-electric machine of the commutator type having a working winding and an exciting winding, of means for connecting portions of said exciting winding in series with said working winding in either direction at will, and means for supplying an auxiliary excitation comprising an auxiliary source of alternating current.

4. The combination with a dynamo-electric machine of the commutator type having a working winding and exciting means, of means for connecting portions of said exciting means in series with said working winding in either direction, and means for supplying an auxiliary excitation to said exciting means.

5. The combination with a source of alternating current, of a generator of the commutator type for supplying energy to said source and provided with an exciting winding, means for connecting one terminal of said source to an intermediate point of said exciting winding, an exciter-machine winding connected across the exciting winding, and means for connecting one armature terminal of said generator to one terminal of said exciter-machine winding.

6. The combination with a source of alternating current, of a generator of the commutator type for supplying energy to said source and provided with an exciting winding, means for connecting one terminal of said source to an intermediate point of said exciting winding, a translating device, an exciter machine having one element connected across the exciting winding and another element connected to said source through said translating device, and means for connecting one armature terminal of said generator to one terminal of said first-named element.

7. The combination with a source of alternating current, of a generator of the commutator type for supplying energy to said source and provided with an exciting winding, means for connecting one terminal of said source to an intermediate point of said exciting winding, a plurality of translating devices, an exciter machine of the commutator type having a primary winding connected to said source, a rotor winding connected to said source through one of said translating devices and a tertiary winding connected to said exciting field winding through another translating device, and means for connecting one armature terminal of said generator to a point intermediate said tertiary winding and the last-named translating device.

In testimony whereof I have hereunto subscribed my name this 22nd day of Sept., 1917.

RUDOLF E. HELLMUND.